United States Patent [19]

Jureit et al.

[11] 4,165,672
[45] Aug. 28, 1979

[54] CONNECTOR PLATE

[75] Inventors: John C. Jureit, Coral Gables; Benjamin H. Kushner, Miami, both of Fla.

[73] Assignee: Automated Building Components, Inc., Miami, Fla.

[21] Appl. No.: 865,930

[22] Filed: Dec. 30, 1977

Related U.S. Application Data

[63] Continuation of Ser. No. 728,945, Oct. 4, 1976, abandoned.

[51] Int. Cl.² ............................................. F16B 5/00
[52] U.S. Cl. ....................................................... 85/13
[58] Field of Search ............................... 85/13, 49, 31

[56] References Cited

U.S. PATENT DOCUMENTS

| 3,390,902 | 7/1968 | Jureit | 85/13 X |
|---|---|---|---|
| 3,479,919 | 11/1969 | Lidsky | 85/13 |
| 3,703,304 | 11/1972 | Losee | 85/13 X |
| 3,892,160 | 7/1975 | Jureit et al. | 85/13 |
| 3,910,153 | 10/1975 | Jureit | 85/13 |
| 3,951,033 | 4/1976 | Moehlenpah | 85/13 |

FOREIGN PATENT DOCUMENTS

| 1146670 | 3/1969 | United Kingdom | 85/13 |
|---|---|---|---|
| 1391811 | 4/1975 | United Kingdom | 85/13 |

Primary Examiner—Thomas J. Holko
Attorney, Agent, or Firm—LeBlanc & Shur

[57] ABSTRACT

This invention relates to a connector plate for joining wooden members comprising a planar metal plate having at least one pair of teeth formed by being struck from the plate so as to form a single opening therebetween with the teeth extending in a direction that is approximately perpendicularly and with the width of one of the teeth at its root being greater than the width of the other tooth at its root, and the length of such one tooth being greater than the length of the other tooth.

7 Claims, 6 Drawing Figures

Fig. 2
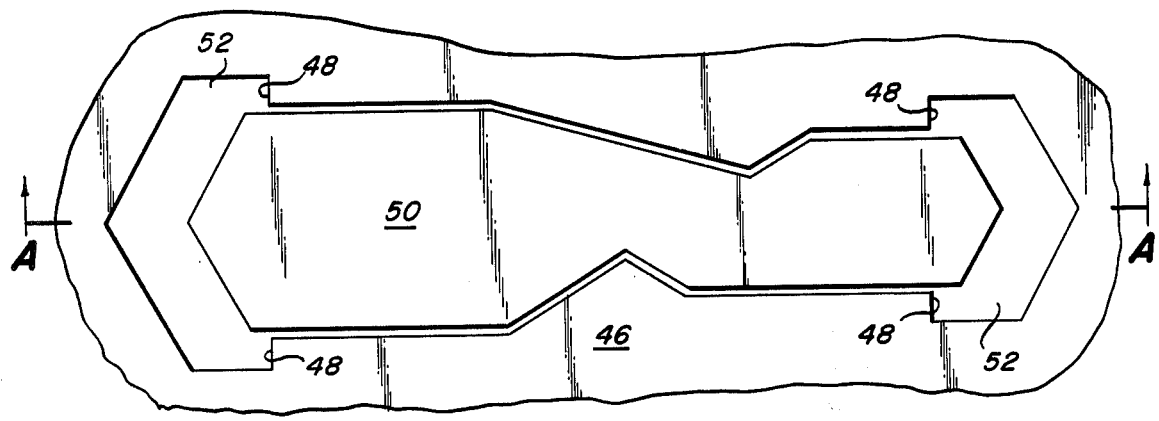
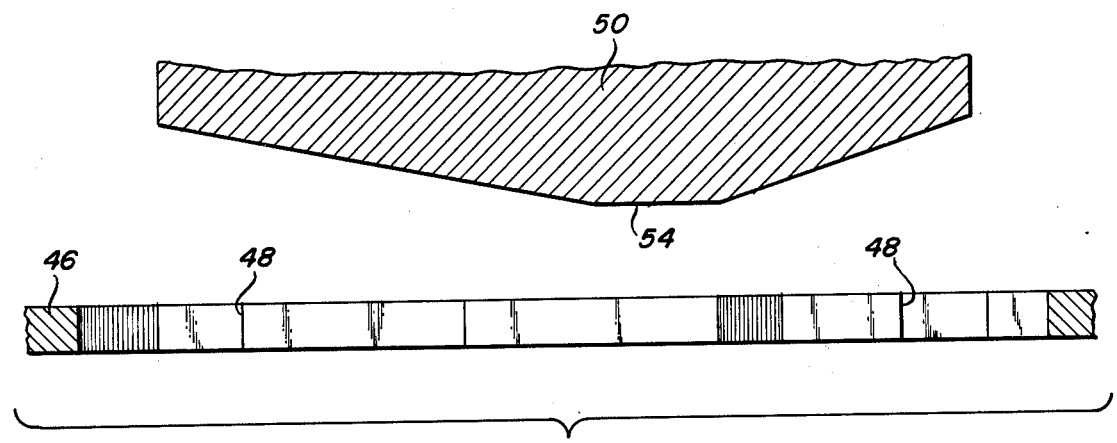
Fig. 2A
Fig. 2B
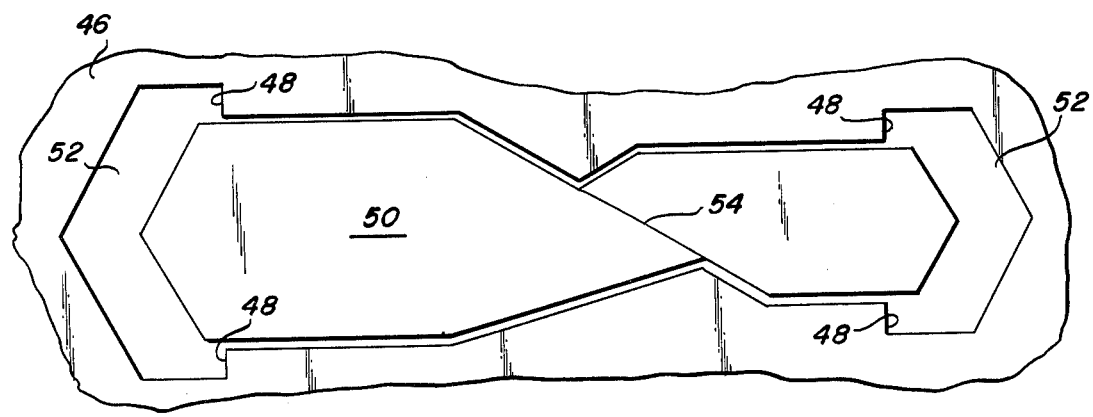

CONNECTOR PLATE

This is a continuation of application Ser. No. 728,945, filed Oct. 4, 1976, and now abandoned.

This invention relates to metal connectors and structural wood joints and particularly to connectors and joints of the butt type used in prefabricated wooden structures such as roof trusses and in the fabrication of furniture.

BACKGROUND OF THE INVENTION

The joinder of structural load-bearing wooden members has been advanced with the advent of structural wooden joints which are maintained in position solely by means of metal plates having slender, elongated, nail-like teeth extending from one side of the plate at an angle of approximately 90° with the plane of the plate, the teeth being embedded into the wooden members as illustrated in U.S. Pat. No. 2,877,520, issued in the name of John Calvin Jureit and assigned to Automated Building Components, Inc. of Miami, Fla.

The teeth are generally formed by striking them from a metal sheet with interfitting male and female dies. The characteristics exhibited by a connector largely depend on the shape and size of the teeth as well as the manner of their distribution on the plate.

Heretofore, it has seemed that the teeth in connectors used for advantageously securing joints between large structural members of soft wood would differ greatly from the teeth for advantageously securing relatively thin structural members of soft wood and that the teeth for each of these purposes would be different from the teeth used in a connector plate designed for use in maintaining the joints between relatively small structural members of hard wood used in furniture.

OBJECTS OF THE INVENTION

It is an object of this invention to provide a configuration that provides good penetration characteristics of the teeth into all species of wood from soft to hard.

In some cases, the members being joined are comprised of very soft wood in which circumstance it is desirable, for withstanding large tension, shear and bending forces, that the teeth have a strong bite.

Generally, it would seem that the greater the number of teeth, the stronger the joint. Up to a point this is true, but the number of teeth per square inch can actually weaken the joint if carried to excess. This is especially true when the wooden members being formed are of soft wood having a thickness of one inch or three quarters of an inch.

Accordingly, it is another object of this invention to provide a connector plate of such configuration as to increase the strength of joints made with thin members made from soft wood.

One of the problems encountered in joining members of hard wood with connector plates of the type herein considered is the greater tendency for hard wood to split, and this of course would not only weaken the joint, but in some cases would render it useless.

Therefore, it is another object of this invention to provide an improved connector plate having teeth of such configuration and distribution as to reduce the frequency with which hard wood members are split when the teeth of this plate are driven into the wood.

Because of the density of the teeth used in most connector plates, it is generally impracticable to drive the teeth into the wooden members being joined with a carpenter's hammer, and it is therefore customary to utilize a machine press. One type of press simultaneously applies pressure to the entire area of the connector plates at one time. The force required to drive the teeth of a plate into the wood depends on their shape, sharpness, and length and, of course, on the density of the wood.

Another type of press involves the use of a pressure roller that is rolled from one end of the connector plate to the other. Less force is required because only the teeth between the roller and the wood are being driven into the wood. However, this places an additional requirement on the design tof the teeth because the portion of the non-imbedded plate in advance of the roller tends to curve away from the wood members with the result that the teeth in this portion approach the wooden members at an angle other than 90°. There is, therefore, a tendency for such teeth to be bent over and not penetrate into the wood. In addition to the loss of strength resulting from a tooth that does not penetrate, there is possible additional loss of strength owing to the fact that a bent-over tooth can prevent the teeth in its vicinity from being fully driven into the wood.

It is another object of this invention, therefore, to provide a connector plate having teeth of such design as to permit them to be fully driven into the wood by either type of press.

Even if all of these objectives are realized, there is one additional characteristic that a connector plate must have, i.e., the connector plate must not work loose as the wood expands and contacts from changes in temperature and humidity, or as the forces applied to the joint vary.

Accordingly, it is a general object of this invention to provide an improved connector plate that remains fully embedded in the wooden member of a joint even though the wood works or moves under the influence of changes in condition or changes in the forces applied to the joint being secured.

BRIEF DESCRIPTION OF PREFERRED EMBODIMENTS

In accordance with one preferred embodiment of this invention, these objectives are attained by a metal connector plate from which at least one pair of teeth extend from one side of said plate at opposite ends of a longitudinal opening from which they have been struck, the teeth being substantially perpendicular to the plate, one tooth being longer than the other, with the longer tooth being wider at its root. Greater columnar strength is provided if the teeth are concave in cross section with the concave sides of the two teeth preferably facing each other. The tendency of the teeth to split hard or dense wood is reduced by providing the teeth with rather blunt diamond points and with a modified diamond shape, the teeth follow a curved path when pressed into the wood so as to provide a clenching action that maintains the tightness of a joint formed with the plate even when the wood works.

DETAILED DESCRIPTION OF THE DRAWINGS

The manner in which these objects as well as other advantages may be achieved in accordance with this invention may be better understood after a detailed consideration of the drawings in which:

FIG. 2 is a fractional enlarged top plan view showing the cross sectional shape of male and female dies used to make the connector plate of FIG. 1;

FIG. 2A is a sectional view of FIG. 2 taken along the plane of line A A; and

FIG. 2B is a fractional enlarged bottom plan view of the dies illustrated in FIG. 2.

DETAILED DESCRIPTION OF THE INVENTION

Figure 1A:
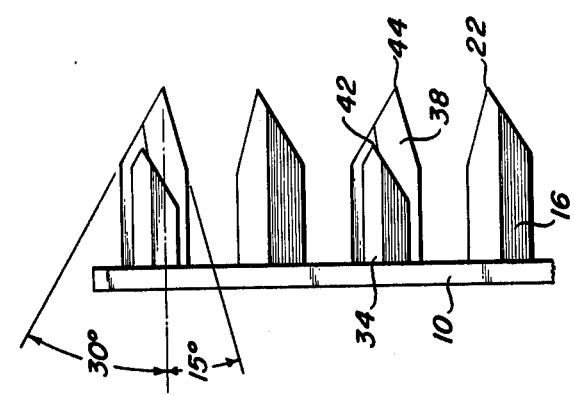
FIG. 1A is an elevational view taken from the left of FIG. 1.
Figure 1:
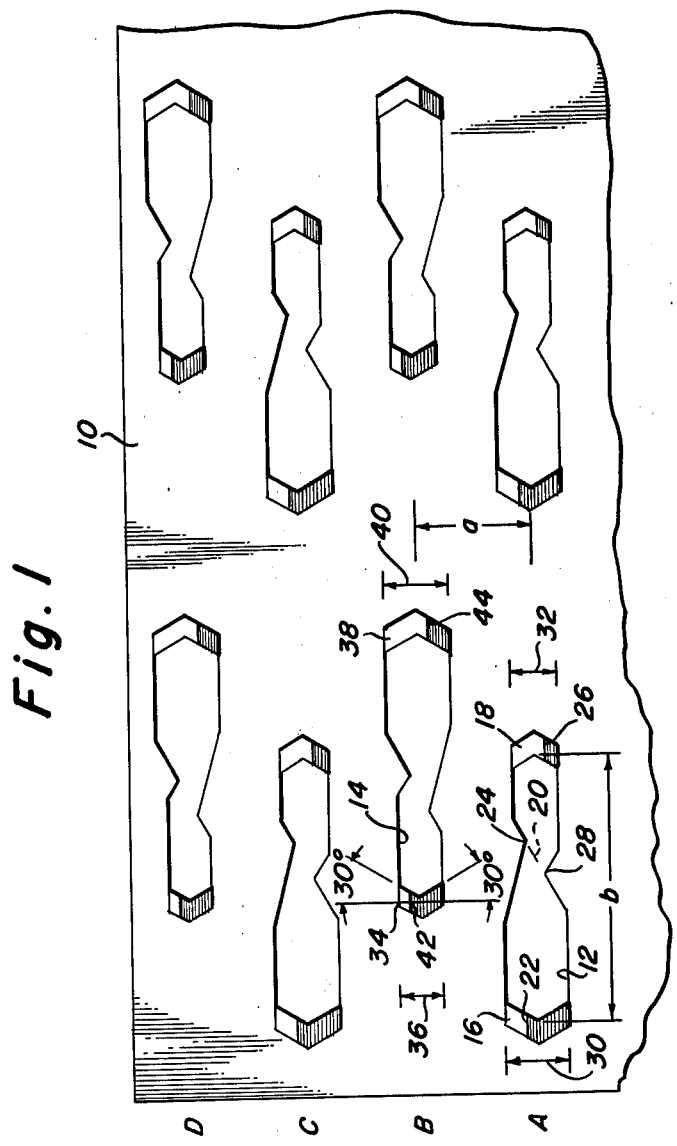
FIG. 1 is a plan view of the connector plate viewed from the side of the connector from which the teeth project.
Figure 1B:
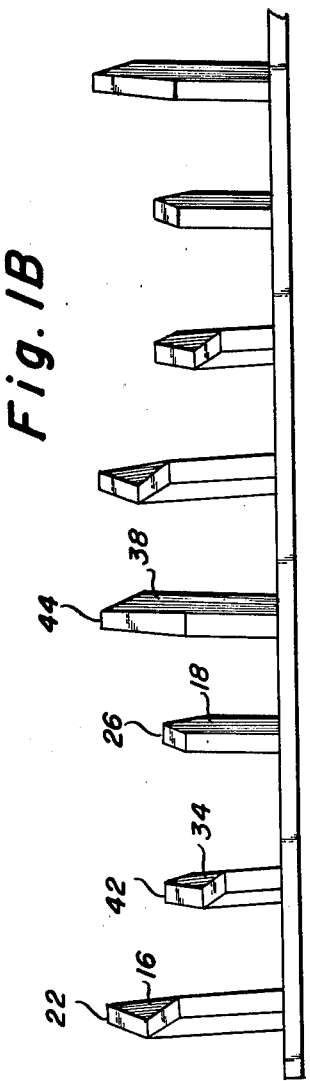
FIG. 1B is an elevational view taken at the bottom of FIG. 1.

Referring now to the drawings and particularly to FIGS. 1, 1A and 1B, there is shown a connector plate 10 having a plurality of toothed apertures therein arranged in rows designated as A, B, C and D. All of the toothed apertures are identical in construction but their orientation on the plate 10 differs. It will be noted that the toothed apertures in rows A and C have their larger ends toward the left and that they are in vertical registration. The toothed apertures in rows B and D have the larger ends to the right and are in vertical registration. However, the toothed apertures of rows A and C are seen to be shifted to the left with respect to the apertures in rows B and D.

In a preferred form of the plate hereof, precisely defined by way of illustration but not limitation, the longitudinally extending rows of teeth defined in rows A and B lie on centers equispaced one from the other across the plate and particularly centers 0.248 inches apart as indicated by the dimension with the centerline of the rows adjacent the margin of the plate lying 0.128 inch from the edge of the plate. The spacing b between the opposing faces of the doublets or teeth is 0.544 inches. The plate is preferably formed of U.S.S. 20 gauge galvanized sheet metal having a nominal thickness of 0.0397 inch. The arrangement of teeth disclosed has approximately 7.1 teeth per square inch. In the preferred embodiment, variations of approximately plus or minus ten percent are permissible.

Only toothed apertures 12 and 14 will be described in detail. The shaded portion at the ends of the aperture 12 are the ends of the teeth 16 and 18 that are formed by male and female dies, to be described later, from the metal of the plate 10. The shape of the dies is such that the metal is severed along a dotted cleavage line 20 so that the high point of the tooth 16, indicated by the solid line 22, is in horizontal alignment with the point 24 where the dotted line 20 intersects the top of the aperture 12. Similarly, the high point of the tooth 18 indicated by the solid line 26 is in horizontal alignment with the point 28 where the dotted line 20 intersects the bottom side of the aperture 12.

An important feature of this invention is that the width of the tooth 16 at its base or root 30, as indicated by the dimension line, is greater than the width of the tooth 18 at its base or root, as indicated by the dimension line 32. It is also to be noted that the wider tooth 16 is taller than the tooth 18, as can be seen from FIG. 1B. This difference in width and height contributes significantly to the ease with which the plate can be applied to wooden members by means of a roller type press.

The ability of the connector plate of this invention to maintain its position even when the wooden members being joined thereby work is due in large part to the clenching action of the teeth 16 and 18 resulting from the fact that the high points 22 and 26 are asymmetrically located. The tooth 16 curves upwardly, as viewed in FIG. 1A, when inserted in the wood, i.e., toward the side of the tooth closest to its high point 22, and the tooth 18 curves downwardly when inserted in the wood because its high point 26 is closest to the lower side. Because the teeth 16 and 18 curve in opposite directions in the wood, any forces of tension generally parallel to the aperture 12 are resisted by some horizontally disposed portions of the wood that are in common and some that are different. The fact that the tooth 16 curves upwardly when pressed into the wood causes it to penetrate portions of the wood that are not horizontally aligned with any portion of the tooth 18 because the latter curves downwardly upon insertion. The same maintenance of position also results in part from the fact that the teeth are of different width and height.

As illustrated in FIG. 1, the aperture 14 has a tooth 34 at its left end that is narrower at its base or root, as indicated by the dimension line 36 than the tooth 38 at the opposite end of the aperture 14, as indicated by the dimension line 40. The high points of the teeth 34 and 38, as indicated by the solid lines 42 and 44 respectively, lie on opposite sides of the horizontal center line of the aperture 14.

Both teeth are visible when viewed from the left as indicated in FIG. 1A. It will be noted that the narrower tooth 34 is also the shorter one and that the high points of the teeth are on the opposite sides of their respective center line. For this reason, the tooth 34 will curve upwardly when inserted in the wood and the tooth 44 will curve downwardly so as to cause the type of clenching action previously referred to.

As shown in FIG. 1, all of the teeth are seen to have a V-shaped cross section with the teeth at opposite ends of each aperture having their concave sides facing each other. The included angle of each "V" is 120°, and the apex of the "V" is at the center.

The modified diamond shape of the teeth contributes to their columnar strength and causes them to follow curved paths when inserted into the wood as is best illustrated in FIG. 1A. In this Figure, the shorter teeth 34 are seen to have a point with an included angle of 60° and the longer teeth are seen to have an included angle of 45° with 15° on one side of vertical and 30° in the other. Hence, the longer teeth have sharper points so as to enable them to penetrate more easily.

Attention is now directed to FIGS. 2, 2A and 2B showing the configuration of the dies used to form the teeth illustrated in FIGS. 1, 1A and 1B. The female die 46 is seen to have shoulders 48 at its ends. The male die 50 is shorter than the female die 46 by an amount approximating the thickness of the metal in the plate so as to accommodate the teeth in the spaces 52. As the male die 50 passes through the plate, it severs the metal along all edges except the "V" shaped ends, i.e., where the edges of the dies are close together. At the same time, it pushes the teeth into an upright position below the openings 52.

As seen in the bottom view of FIG. 2B, the teeth are separated by a tearing action along the cleavage line 20 due to a raised edge 54 in the male die 50.

FIG. 2A shows an elevational view of the male die 50 showing the raised edge 54.

This invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency are therefore intended to be embraced therein.

What is claimed and desired to be secured by United States Letters Patent is:

1. A connector plate for joining wooden members comprising a planar metal plate, a plurality of pairs of teeth on said plate formed by being struck from said plate so as to form a single opening between said teeth of each said pair, said teeth extending in a direction that is approximately perpendicular to the plane of said plate, each of said teeth having a modified diamond configuration at its free end, the width of one tooth of said pair of teeth at its root being greater than the width of the other tooth of said pair at its root, the length of said one tooth being greater than the length of said other tooth and the point of said one tooth of said pair of teeth is on one side of the center of its root and the point of said other tooth of said pair of teeth is on the opposite side of the center of its root to impart clenching action to said teeth as they are embedded into material to be joined together, said openings being disposed in parallel longitudinal rows and said teeth being disposed in said rows.

2. A connector plate as set forth in claim 1 wherein said teeth are concave on the sides facing each other in a pair.

3. A connector plate according to claim 1 wherein said plate is formed of 20 U.S. Standard gauge galvanized sheet metal.

4. A connector plate according to claim 1 wherein said teeth are distributed throughout said plate to provide a tooth density of at least seven teeth per square inch.

5. A connector plate as set forth in claim 1 wherein said teeth are concave on the sides facing each other.

6. A connector plate according to claim 5 wherein said teeth are distributed throughout said plate to provide a tooth density of at least seven teeth per square inch.

7. A connector plate as set forth in claim 1 wherein said teeth are concave on the sides facing each other, and wherein said teeth are distributed throughout said plate to provide a tooth density of at least seven teeth per square inch, and wherein the longitudinally extending rows of teeth lie on centers equispaced one from the other across the plate, said centers being 0.248 inches apart (plus or minus 10%) with the centerline of the rows adjacent the margin of the plate lying 0.128 inch (plus or minus 10%) from the edge of the plate, the spacing between the opposing faces of a pair of teeth being 0.544 inches (plus or minus 10%).

* * * * *